United States Patent
Suissa et al.

(10) Patent No.: US 10,131,196 B2
(45) Date of Patent: Nov. 20, 2018

(54) SPRING-DAMPER ASSEMBLY

(71) Applicant: GM GLOBAL TECHNOLOGY OPERATIONS LLC, Detroit, MI (US)

(72) Inventors: Avshalom Suissa, Kiryat Ono (IL); Vladimir Suplin, Modiin (IL)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 15/404,886

(22) Filed: Jan. 12, 2017

(65) Prior Publication Data
US 2018/0194189 A1 Jul. 12, 2018

(51) Int. Cl.
*B60G 17/052* (2006.01)
*B60G 15/12* (2006.01)
*B60G 15/14* (2006.01)

(52) U.S. Cl.
CPC ......... *B60G 17/0521* (2013.01); *B60G 15/12* (2013.01); *B60G 2202/314* (2013.01); *B60G 2206/424* (2013.01); *B60G 2500/201* (2013.01); *B60G 2500/30* (2013.01); *B60G 2800/162* (2013.01)

(58) Field of Classification Search
CPC .......... B60G 17/0521; B60G 2206/424; B60G 15/12; B60G 15/14; B60G 2202/314; B60G 2202/32; B60G 2500/201; B60G 2500/30; B60G 2800/162
See application file for complete search history.

(56) References Cited

U.S. PATENT DOCUMENTS

| | | | | |
|---|---|---|---|---|
| 971,583 A | * | 10/1910 | Bell | F16F 9/05 236/26 C |
| 2,846,983 A | * | 8/1958 | Otto | F01B 19/04 267/122 |
| 3,046,003 A | * | 7/1962 | Schultz | B60G 15/12 267/64.24 |
| 3,083,026 A | * | 3/1963 | Broadwell | B60G 13/14 267/64.17 |
| 3,582,106 A | * | 6/1971 | Keijzer | B60G 15/12 267/64.19 |

(Continued)

FOREIGN PATENT DOCUMENTS

| | | | | |
|---|---|---|---|---|
| DE | 3501651 A1 | * | 7/1986 | ............ B60G 15/14 |
| DE | 19961717 A1 | * | 7/2001 | ............ B60G 15/12 |

(Continued)

*Primary Examiner* — Laura Freedman
(74) *Attorney, Agent, or Firm* — Quinn IP Law

(57) ABSTRACT

A spring-damper assembly for a suspension corner employed in a vehicle having a vehicle body and a road wheel includes a fluid spring configured to suspend the vehicle body relative to the road wheel. The spring-damper assembly also includes a damper configured to attenuate compression and rebound oscillations of the fluid spring. The spring-damper assembly additionally includes a spring-seat housing configured to retain the fluid spring and establish a position of the fluid spring relative to the damper. The spring-seat housing includes an inner surface defining a contour configured to guide the fluid spring upon compression thereof around the damper and define a non-linear stiffness of the fluid spring. A vehicle having such a spring-damper assembly is also provided.

18 Claims, 3 Drawing Sheets

(56) References Cited

U.S. PATENT DOCUMENTS

| | | | | |
|---|---|---|---|---|
| 3,700,225 A * | 10/1972 | Fader | ............... | F16F 9/084 267/35 |
| 4,022,448 A * | 5/1977 | Reeder | ............... | F16F 9/084 188/269 |
| 4,105,193 A * | 8/1978 | Long, Jr. | ............... | B60G 15/12 188/315 |
| 4,200,270 A * | 4/1980 | Merkle | ............... | B60G 11/27 267/64.24 |
| 4,396,202 A * | 8/1983 | Kanni; Yozo | ............... | B60G 11/58 267/64.16 |
| 4,493,481 A * | 1/1985 | Merkle | ............... | B60G 11/27 267/64.24 |
| 4,518,154 A * | 5/1985 | Merkle | ............... | B60G 11/27 267/151 |
| 4,655,438 A * | 4/1987 | Cameron | ............... | B60G 15/14 267/220 |
| 4,690,388 A * | 9/1987 | Harrison | ............... | B60G 7/04 105/198.1 |
| 4,712,776 A * | 12/1987 | Geno | ............... | B60G 15/14 188/322.12 |
| 4,718,683 A * | 1/1988 | Perga | ............... | B60G 15/068 280/6.157 |
| 5,449,150 A * | 9/1995 | Watanabe | ............... | B60G 15/12 188/267.1 |
| 5,460,354 A * | 10/1995 | Easter | ............... | B60G 15/12 188/322.12 |
| 5,769,401 A * | 6/1998 | Pradel | ............... | B60G 15/12 206/335 |
| 6,685,173 B2 * | 2/2004 | Oldenettel | ............... | B60G 11/28 267/122 |
| 6,817,597 B1 * | 11/2004 | Thurow | ............... | B60G 11/265 267/122 |
| 6,827,341 B2 * | 12/2004 | Bank | ............... | B60G 11/27 188/322.12 |
| 6,845,973 B2 * | 1/2005 | Ferrer | ............... | F16F 9/0454 267/64.21 |
| 6,905,126 B1 * | 6/2005 | Jurrens | ............... | B60G 15/14 280/284 |
| 7,077,052 B2 * | 7/2006 | Lloyd | ............... | B60G 15/14 267/64.21 |
| 7,188,827 B2 * | 3/2007 | Thomae | ............... | B60G 11/27 267/122 |
| 7,213,799 B2 * | 5/2007 | Behmenburg | ............... | B60G 17/0521 267/64.22 |
| 7,322,567 B2 * | 1/2008 | Lloyd | ............... | B60G 15/14 188/322.19 |
| 7,802,776 B2 * | 9/2010 | Behmenburg | ............... | B60G 17/0485 188/298 |
| 8,285,448 B2 * | 10/2012 | Inoue | ............... | B60G 15/08 280/5.514 |
| 9,206,874 B2 * | 12/2015 | Sugata | ............... | B60G 15/12 |
| 9,428,029 B2 * | 8/2016 | Job | ............... | B60G 15/14 |
| 9,604,520 B2 * | 3/2017 | Weber | ............... | B60G 17/0485 |
| 9,611,001 B2 * | 4/2017 | Awasa | ............... | B62K 25/283 |
| 9,707,817 B1 * | 7/2017 | Arnott | ............... | B60G 15/12 |
| 2006/0108749 A1 * | 5/2006 | Kim | ............... | B60G 15/12 280/5.508 |
| 2015/0354654 A1 | 12/2015 | Brand et al. | | |
| 2016/0280316 A1 * | 9/2016 | Yoshida | ............... | B62K 25/10 |
| 2017/0217273 A1 * | 8/2017 | Schallmeier | ............... | B60G 11/27 |

FOREIGN PATENT DOCUMENTS

| | | | | |
|---|---|---|---|---|
| EP | 1369267 A2 * | 12/2003 | ............... | B60G 3/01 |
| JP | 55051610 A * | 4/1980 | ............... | B60G 17/01933 |
| JP | 56060711 A * | 5/1981 | ............... | B60G 17/015 |
| JP | 03177633 A * | 8/1991 | ............... | B60G 11/27 |
| JP | 2006327296 A * | 12/2006 | | |

\* cited by examiner

SPRING-DAMPER ASSEMBLY

INTRODUCTION

The present disclosure relates to a spring-damper assembly for use in a vehicle suspension.

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced vehicle response, while a suspension for a luxury vehicle may be tuned for the opposite outcome. Such supensions typically employ springs and dampers that cooperate to achieve a desired suspension tuning.

SUMMARY

A spring-damper assembly for a suspension corner employed in a vehicle having a vehicle body and a road wheel includes a fluid spring configured to suspend the vehicle body relative to the road wheel. The spring-damper assembly also includes a damper configured to attenuate compression and rebound oscillations of the fluid spring. The spring-damper assembly additionally includes a spring-seat housing configured to retain the fluid spring and establish a position of the fluid spring relative to the damper. The spring-seat housing includes an inner surface defining a contour configured to guide the fluid spring upon compression thereof around the damper and define a non-linear stiffness of the fluid spring.

The non-linear stiffness may define a progressive decrease or reduction from a positive stiffness to zero stiffness.

In a cross-sectional view, the contour of the spring-seat housing inner surface may include a horn shape, for example, a progressively widening bell curvature.

The damper may include a damper rod and the fluid spring may define a passage. In such an embodiment, the damper rod may extend through the passage.

The spring-seat housing may define an aperture and the damper rod may extend through the aperture.

The spring-seat housing may additionally include a fluid inlet configured to receive a fluid from an external fluid pump and channel the fluid to the fluid spring.

The fluid received by the fluid inlet may be a gas, e.g., air.

The spring-damper assembly may be defined by a static height. In such an embodiment, the fluid spring may be configured to establish the static height of the spring-damper assembly in response to a volume of the fluid received by the fluid inlet.

The spring-seat housing may extend at least partially around the damper and define a space configured to guide expansion of the fluid spring at least partially around the damper upon compression of the fluid spring.

The spring-damper assembly may additionally include a sheath extending between the spring-seat housing and the damper. The sheath may be configured to shield the fluid spring from elements external to the spring-damper assembly.

Also disclosed is a vehicle having a vehicle body, a road wheel, and a suspension corner connecting the road wheel to the vehicle body. The suspension corner is configured to maintain contact between the road wheel and the road surface and provide isolation of vibration between the road wheel and the vehicle body. The suspension corner employs the spring-damper assembly described above. The vehicle may employ a fluid pump configured to supply fluid to the fluid spring.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1:
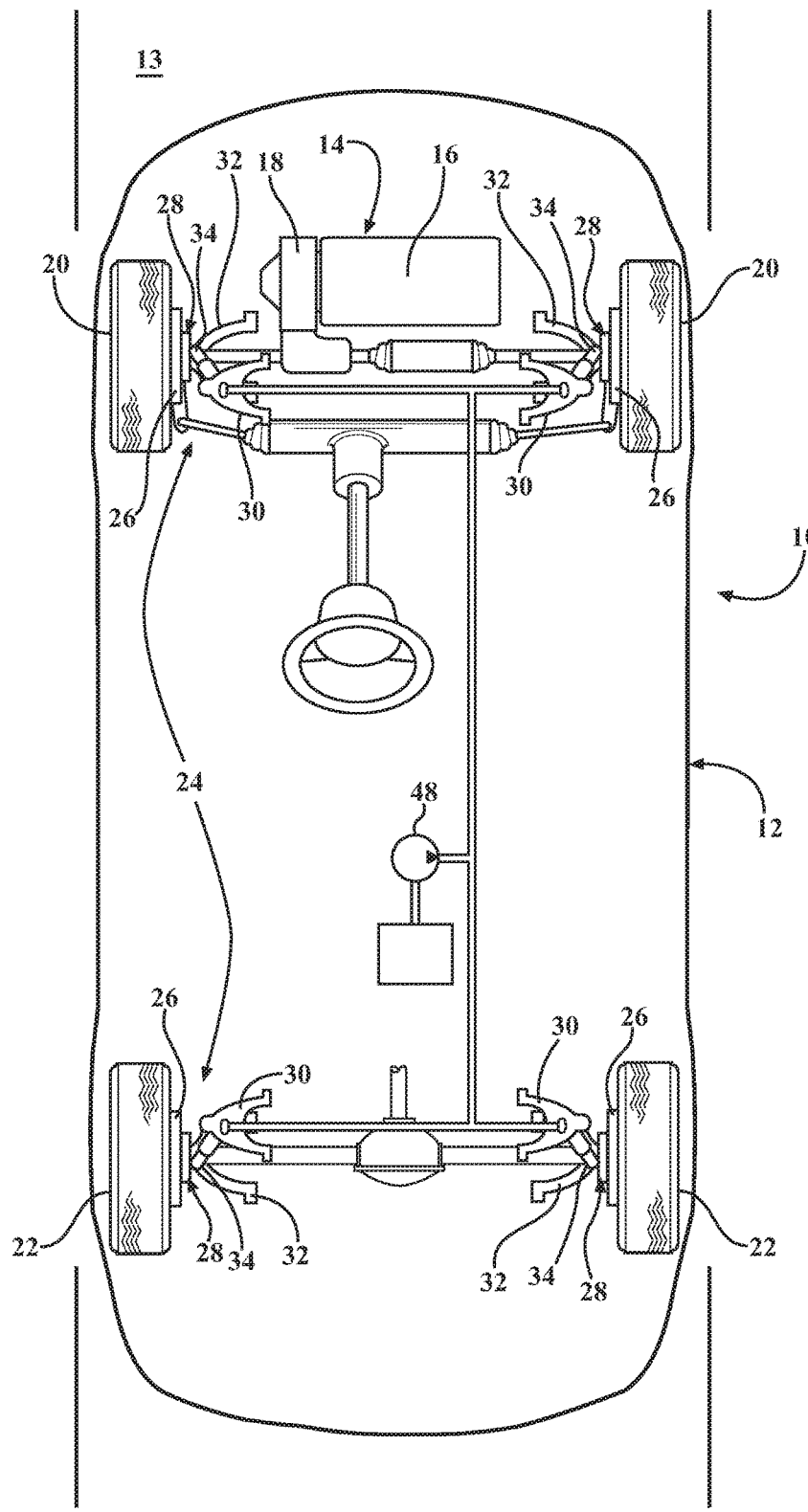
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle. The suspension system 24 includes a plurality of knuckles 26, each configured to support a respective road wheel 20, 22 via a wheel hub and bearing assembly (not shown). Each knuckle 26 may be operatively connected to the body 12 via an upper control arm 30 and a lower control arm 32.

Figure 2:
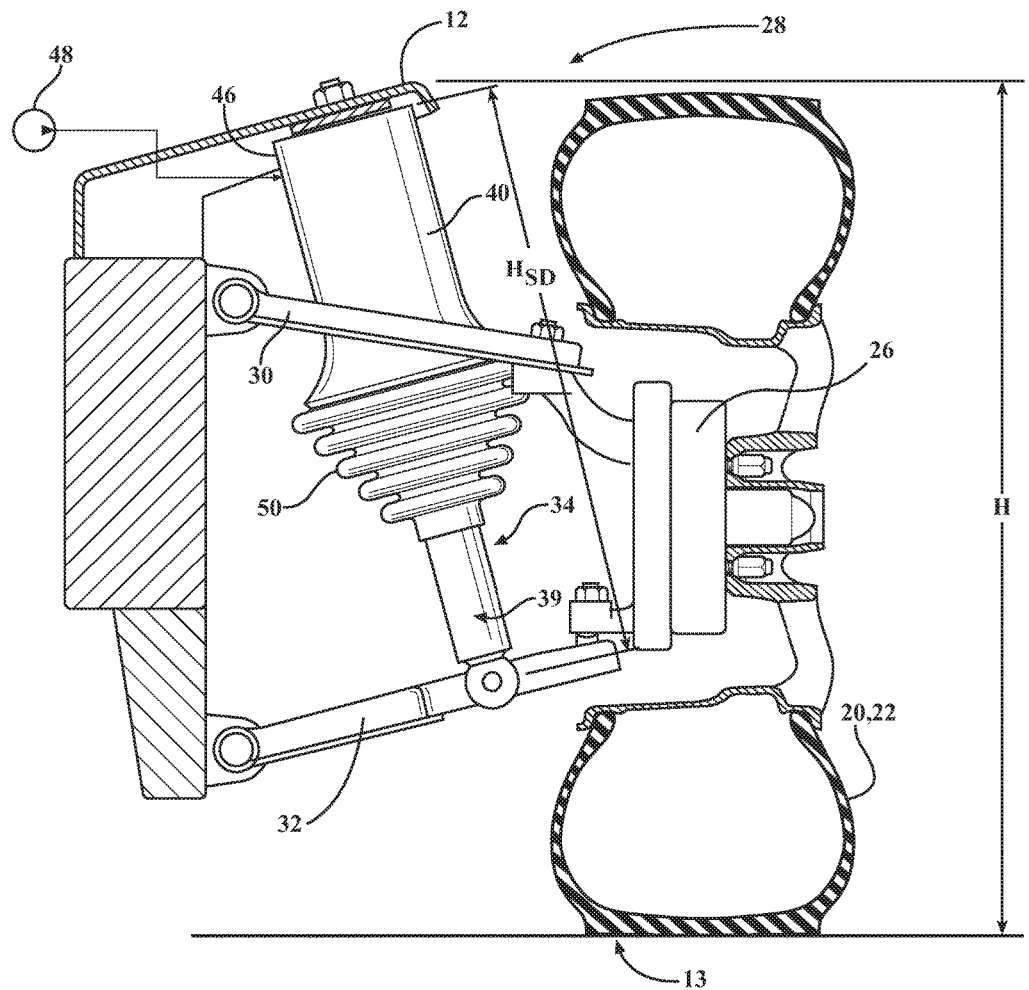
FIG. 2 is an enlarged schematic cross-sectional illustration of a representative suspension corner of the vehicle shown in FIG. 1, having a spring-damper assembly according to the disclosure.
Figure 3:
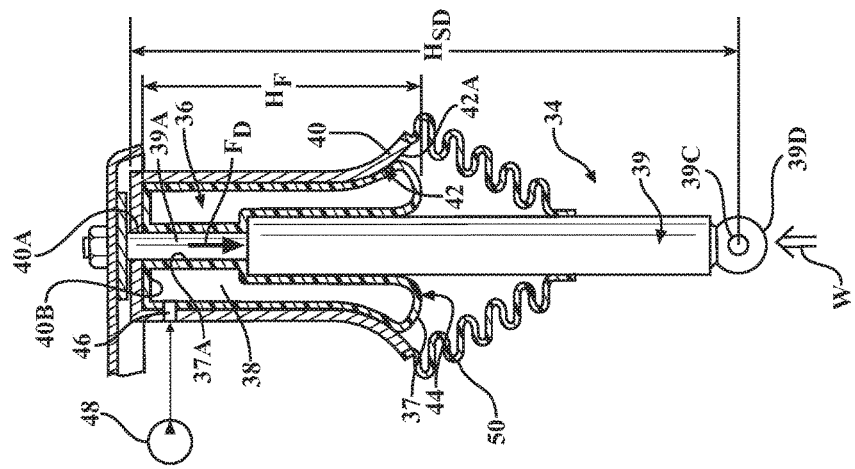
FIG. 3 is a schematic partial cross-sectional illustration of the spring-damper assembly shown in FIG. 2, employing a fluid spring, a damper, and a spring-seat housing having an inner surface establishing a positive stiffness mode of the fluid spring according to the present disclosure.

FIG. 2 depicts a representative corner 28 of the suspension system 24, which includes a representative knuckle 26. Although a specific configuration of the suspension system 24 is shown in FIGS. 2-3, other vehicle suspension designs are also envisioned. Accordingly, each suspension corner 28 connects its respective road wheel 20, 22 to the vehicle body 12 and is configured to maintain contact between the subject road wheel and the road surface 13. As also shown in FIG. 2, each individual suspension corner 28 establishes a specific height H of the vehicle body 12 relative to the road surface 13, i.e., vehicle ride height. Furthermore, each suspension corner 28 provides isolation of vibration between the respective road wheel 20, 22 and the vehicle body 12, and attenuation of excitation forces from the road surface 13, for example generated by various road imperfections and undulations, such as bumps and potholes.

With continued reference to FIG. 2, the representative suspension corner 28 includes a spring-damper assembly 34 configured to attach the road wheel 20, 22 to the vehicle body 12. Furthermore, the spring-damper assembly 34 is configured to control motion of the respective wheel 20, 22 during operation of the vehicle 10 and provide desired ride comfort and vehicle response. The spring-damper assembly 34 includes a fluid spring 36 configured to suspend the vehicle body 12 relative to the respective road wheel 20, 22 and generate a desired spring rate, i.e., stiffness. The fluid spring 36 includes a deformable or elastic bladder 37 filled with a fluid 38. The fluid spring 36 may generate the desired spring stiffness via compression of the fluid 38 contained therein and/or elastic deformation of the bladder 37.

The spring-damper assembly 34 also includes a damper 39 configured to attenuate compression and rebound oscillations of the fluid spring 36. The damper 39 may employ a viscous fluid acted on by an internal piston (not shown) to generate the desired damping. The spring-damper assembly 34 additionally includes a spring-seat housing 40 configured to retain the fluid spring 36. The spring-seat housing 40 is also configured to establish a position of the fluid spring 36 relative to the damper 39 in an unloaded state of the spring-damper assembly 34 and also in response to a load W, such as the weight of the vehicle body 12 and/or excitation forces from the road surface 13.

Figure 4:
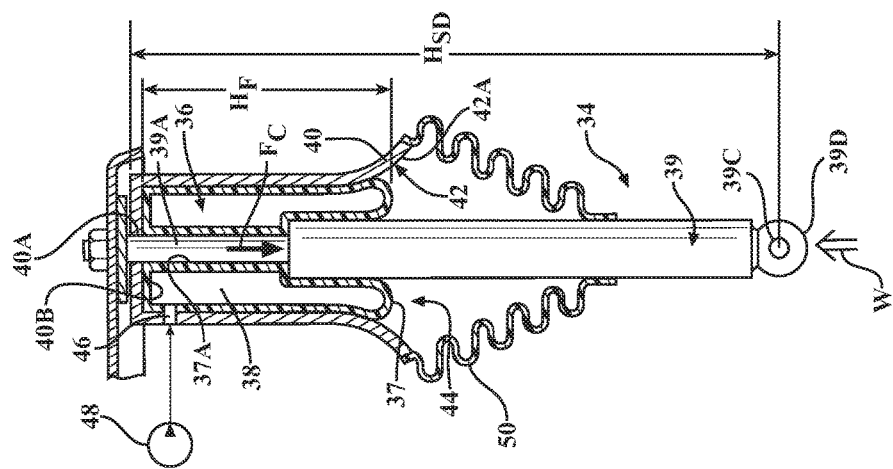
FIG. 4 is a schematic partial cross-sectional illustration of the spring-damper assembly shown in FIG. 2, depicting the inner surface of the spring-seat housing establishing a zero stiffness mode of the fluid spring according to the present disclosure.
Figure 5:
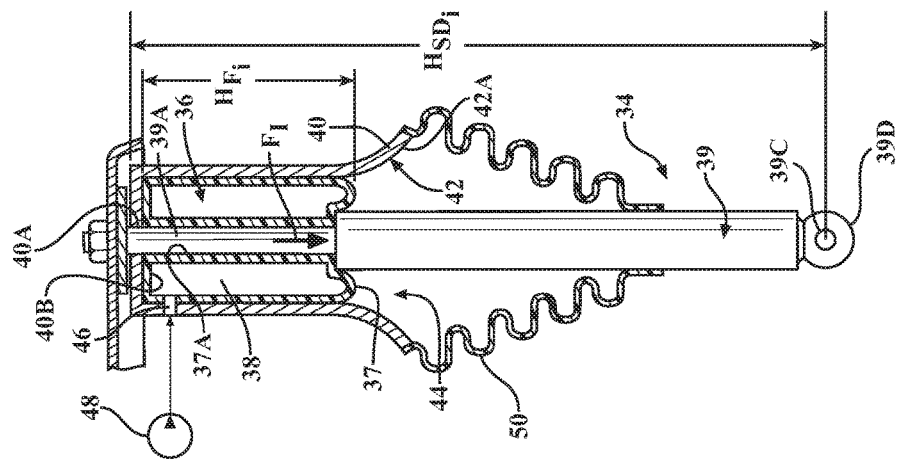
FIG. 5 is a schematic partial cross-sectional illustration of the spring-damper assembly shown in FIG. 2, depicting the inner surface of the spring-seat housing establishing a negative stiffness mode of the fluid spring according to the present disclosure.

The spring-seat housing 40 includes an inner surface 42 defining a contour 42A configured to guide the fluid spring 36 around the damper 39 upon compression of the fluid spring. As shown, the spring-seat housing 40 may extend at least partially around the damper 39. Additionally, the spring-seat housing 40 may be spaced apart from the damper 39 and thereby define a space 44 configured to guide expansion of the bladder 37 at least partially around the damper 39 upon compression of the fluid spring. As shown in FIGS. 3-5, in a cross-sectional view, the contour 42A of the spring-seat housing inner surface 42 may include a horn shape, such as a progressively widening bell curvature. The fluid spring bladder 37 is configured to establish contact with progressively greater area of the inner surface 42 along the contour 42A over the compression stroke of the fluid spring 36. In other words, the bladder 37 adapts to the size variation of the space 44 as the load W increases on the fluid spring 36. Specifically, the contour 42A defines a non-linear effective stiffness for the fluid spring 36.

The interaction between the inner surface 42 and the fluid spring 36 may be designed to elicit a predetermined positive stiffness at the fluid spring's unloaded state and into the initial compression stroke, while eliciting a reduced and negative effective fluid spring stiffness further into the compression stroke. Such progression from the predetermined positive stiffness of the fluid spring 36 to the negative effective fluid spring stiffness is established by the specifically selected shape of the contour 42A, and may be as gradual as required to establish desired ride characteristics for the vehicle. The non-linear stiffness of the fluid spring 36 established by the contour 42A may define a progressive decrease of the stiffness from positive stiffness (shown in FIG. 3) to zero stiffness (shown in FIG. 4), and on to negative stiffness (shown in FIG. 5).

As employed herein, a positive stiffness mode of the fluid spring 36 is defined as a spring mode that generates an increasing force $F_1$ over a part of the spring's compression travel taking place along an active height $H_{SD}$ of the spring-damper assembly 34. On the other hand, as also defined herein, in a zero stiffness mode the fluid spring 36 is configured to generate a constant force $F_C$ over some portion of the fluid spring's compression travel and along the height $H_{SD}$ of the spring-damper assembly 34 as the subject spring undergoes additional deformation along the height $H_{SD}$. As the bladder 37 of the subject fluid spring 36 undergoes continued deformation along the height $H_{SD}$, the fluid spring may enter a negative stiffness mode, where the fluid spring 36 is configured to generate a decreasing force $F_D$ over the fluid spring's compression travel, i.e., along the height $H_{SD}$ of the spring-damper assembly 34. In the positive stiffness mode shown in FIG. 3, the fluid spring 36 may be configured to generate a predetermined force at static vehicle ride height H (shown in FIG. 2). In a progression to the zero stiffness mode (shown in FIG. 4), and on to the negative stiffness mode (shown in FIG. 5), the bladder 37 guided by the contour 42A may then generate the constant force $F_C$ and then the decreasing force $F_D$ as the subject spring becomes sufficiently loaded under additional load W on the vehicle body 12 or in response to excitation from the road surface 13.

The spring-damper assembly 34 may be packaged such that the excitation forces from the road surface 13 and/or the weight of the vehicle body 12 forces are transferred through both the fluid spring 36 and the damper 39. To such an end, as shown in FIGS. 3-5, the bladder 37 may define a passage 37A, while the damper 39 may include a damper rod 39A. The spring-seat housing 40 may also define an aperture 40A, such that the damper rod 39A may extend through the housing aperture. In such an embodiment, the damper rod 39A would extend through the passage 37A and the aperture 40A, toward the vehicle body 12, and be attached thereto. As also shown in FIGS. 3-5, the damper 39 may include a mounting feature, such as a bracket 39D with a fastener eyelet 39C.

During operation of the vehicle 10 over uneven terrain or when the vehicle is loaded with cargo, an active height $H_{SD}$ of the spring-damper assembly 34 will vary in response to additional load W on the vehicle body 12 or in response to excitation from the road surface 13 (shown in FIGS. 4-5). As shown in FIGS. 2-5, the spring-seat housing 40 additionally includes a fluid inlet 46 configured to receive the fluid 38 from a fluid pump 48 (also shown in FIG. 1). The fluid pump 48 may be arranged on the vehicle 10, externally with respect to the spring-damper assembly 34, and configured to channel the fluid 38 to the fluid spring 36. The fluid 38 channeled to the fluid spring 36 may be a compressible gas, such as air. The fluid 38 channeled to the fluid spring 36 may alternatively be oil or other liquid. The spring-damper assembly 34 may be defined by an initial or static height $H_{SDi}$ (shown in FIG. 3).

The fluid spring 36 may have a height $H_F$ (shown in FIGS. 3-5) configured to establish the active height $H_{SD}$, while the static height $H_{SDi}$ of the spring-damper assembly 34 is established by an initial height $H_{Fi}$ of the fluid spring. The initial height $H_{Fi}$ of the fluid spring 36 is established via a volume of the fluid 38 received by the fluid inlet 46. As shown, the spring-seat housing 40 includes a reaction surface 40B for the fluid spring 36. The volume of the fluid 38 contained within the fluid spring 36 may establish a separation between the reaction surface 40B and the damper 39. Furthermore, the static height $H_{SDi}$ of the spring-damper assembly 34, and, therefore, the volume of the fluid 38 contained within the bladder 37, may be employed to establish the ride height H of the vehicle body 12 relative to the road surface 13. The spring-damper assembly 34 may additionally include a sheath 50 extending between the spring-seat housing 40 and the damper 39. The sheath 50 may be configured to shield the fluid spring 36 from elements external to the spring-damper assembly 34. As shown in FIG. 2, the sheath 50 may be configured as a bellows, and thus constructed to fold and unfold in response to the respectively decreasing and increasing active height $H_{SD}$ (shown in FIGS. 4 and 5, respectively) of the spring-damper assembly 34.

Accordingly, the suspension system 24 employing spring-damper assemblies 34 may achieve a mechanically maintained vehicle ride height H under a predetermined load W, such as the weight of the vehicle body 12. Additionally, the bladder 37 of the spring 36 being guided by the contour 42A may generate the heretofore described non-linear spring rate when subjected to additional compression forces, for example when the vehicle is loaded with cargo or in response to excitation from the road surface 13. Such non-linear spring rate of the spring-damper assembly 34 under additional loading and compression is intended to facilitate enhanced ride quality of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A spring-damper assembly for a suspension corner employed in a vehicle having a vehicle body and a road wheel, the spring-damper assembly comprising:
   a fluid spring configured to suspend the vehicle body relative to the road wheel;
   a damper configured to attenuate compression and rebound oscillations of the fluid spring; and
   a spring-seat housing configured to retain the fluid spring and establish a position of the fluid spring relative to the damper;
   wherein:
     the spring-seat housing includes an inner surface defining a contour configured to guide the fluid spring upon compression thereof around the damper and define a non-linear stiffness of the fluid spring; and
     in a cross-sectional view, the contour of the spring-seat housing inner surface includes a horn shape having a progressively widening bell curvature.

2. The spring-damper assembly according to claim 1, wherein the non-linear stiffness defines a progressive decrease from a positive stiffness to zero stiffness.

3. The spring-damper assembly according to claim 1, wherein:
   the damper includes a damper rod;
   the fluid spring defines a passage; and
   the damper rod extends through the passage.

4. The spring-damper assembly according to claim 3, wherein the spring-seat housing defines an aperture, and wherein the damper rod extends through the aperture.

5. The spring-damper assembly according to claim 1, wherein the spring-seat housing additionally includes a fluid inlet configured to receive a fluid from an external fluid pump and channel the fluid to the fluid spring.

6. The spring-damper assembly according to claim 5, wherein the fluid received by the fluid inlet is a gas.

7. The spring-damper assembly according to claim 6, wherein:
   the spring-damper assembly is defined by a static height; and
   the fluid spring is configured to establish the static height of the spring-damper assembly in response to a volume of the fluid received by the fluid inlet.

8. The spring-damper assembly according to claim 1, wherein the spring-seat housing extends at least partially around the damper and defines a space configured to guide expansion of the fluid spring at least partially around the damper upon compression of the fluid spring.

9. The spring-damper assembly according to claim 1, further comprising a sheath extending between the spring-seat housing and the damper, wherein the sheath is configured to shield the fluid spring from elements external to the spring-damper assembly.

10. A vehicle comprising:
    a vehicle body;
    a road wheel configured to maintain contact with a road surface; and
    a suspension corner connecting the road wheel to the vehicle body and configured to maintain contact between the road wheel and the road surface, wherein the suspension corner includes:
      a spring-damper assembly configured to provide isolation of vibration between the road wheel and the vehicle body, the spring-damper assembly comprising:
        a fluid spring configured to suspend the vehicle body relative to the road wheel;
        a damper configured to attenuate compression and rebound oscillations of the fluid spring; and
        a spring-seat housing configured to retain the fluid spring and establish a position of the fluid spring relative to the damper;
        wherein:
          the spring-seat housing includes an inner surface defining a contour configured to guide the fluid spring upon compression thereof around the damper and define a non-linear stiffness of the fluid spring; and in a cross-sectional view, the contour of the spring-seat housing inner surface includes a horn shape having a progressively widening bell curvature.

11. The vehicle according to claim 10, wherein the non-linear stiffness defines a progressive decrease from a positive stiffness to zero stiffness.

12. The vehicle according to claim 10, wherein:
the damper includes a damper rod;
the fluid spring defines a passage; and
the damper rod extends through the passage.

13. The vehicle according to claim 12, wherein the spring-seat housing defines an aperture, and wherein the damper rod extends through the aperture.

14. The vehicle according to claim 10, further comprising a fluid pump configured to supply fluid to the fluid spring, wherein the spring-seat housing additionally includes a fluid inlet configured to receive the fluid from the fluid pump and channel the fluid to the fluid spring.

15. The vehicle according to claim 14, wherein the fluid received by the fluid inlet is a gas.

16. The vehicle according to claim 15, wherein:
the spring-damper assembly is defined by a static height; and
the fluid spring is configured to establish the static height of the spring-damper assembly in response to a volume of the fluid received, by the fluid inlet.

17. The vehicle according to claim 10, wherein the spring-seat housing extends at least partially around the damper and defines a space configured to guide expansion of the fluid spring at least partially around the damper upon compression of the fluid spring.

18. The vehicle according to claim 10, wherein the spring-damper assembly additionally includes a sheath extending between the spring-seat housing and the damper, and wherein the sheath is configured to shield the fluid spring from elements external to the spring-damper assembly.

* * * * *